A. FEY.
BEARING TAKING DEVICE FOR COMPASS HOODS.
APPLICATION FILED SEPT. 26, 1908.

934,904.

Patented Sept. 21, 1909.

2 SHEETS—SHEET 1.

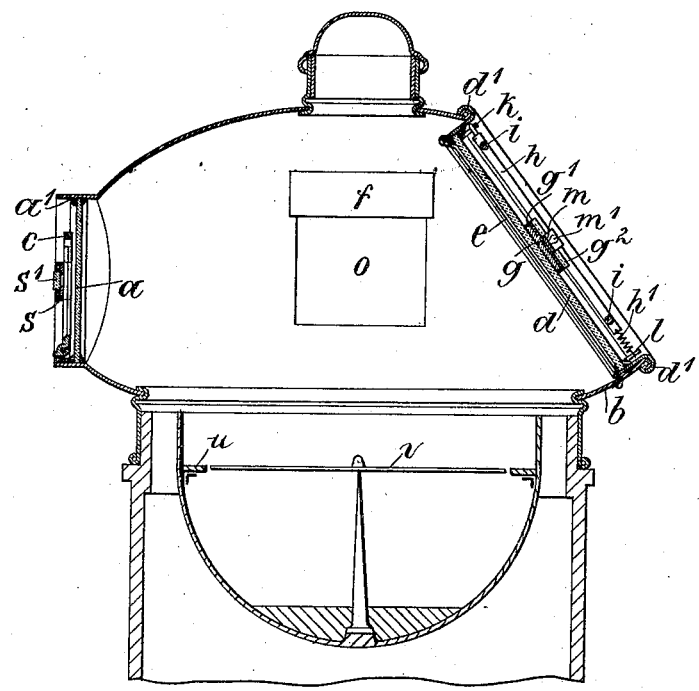

UNITED STATES PATENT OFFICE.

ALEXANDER FEY, OF HAMBURG, GERMANY.

BEARING-TAKING DEVICE FOR COMPASS-HOODS.

934,904.  Specification of Letters Patent.  Patented Sept. 21, 1909.

Application filed September 26, 1908. Serial No. 454,943.

*To all whom it may concern:*

Be it known that I, ALEXANDER FEY, captain, a subject of the German Emperor, and resident of No. 14 Maxstrasse, Hamburg, Germany, have invented certain new and useful Improvements Relating to a Bearing-Taking Device for a Compass-Hood, of which the following is a specification.

This invention relates to a bearing taking device for compasses, its essential feature being that it is fitted in the hood of the compass.

In bad weather the compass box effects such violent movements that it is impossible to take reliable bearings by means of the known diopter which is arranged upon the compass box after the hood has been removed. In order to take bearings in bad weather it is necessary to check the movements of the compass box, that is to say, to hold it, but this necessarily entails defects in taking the bearings which are frequently considerable.

The known diopter can only be used after the hood of the compass has been removed and at night time its use is only possible either when the compass rose is illuminated by a lamp held by a second man so that the man entrusted with taking the bearings can see, or when, as has latterly been done, the compass box is provided with a glass bottom below which a light is arranged.

Figure 1:
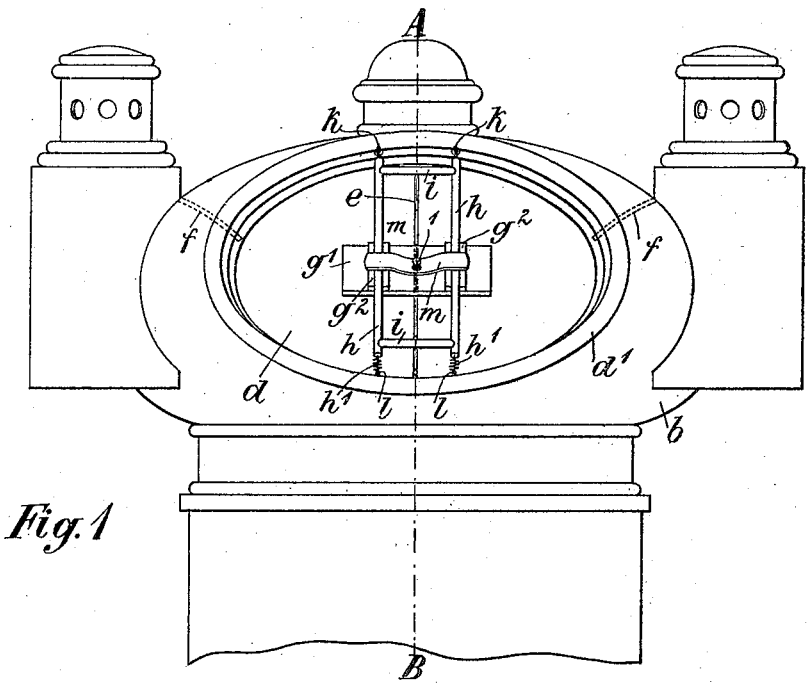
Figure 2:
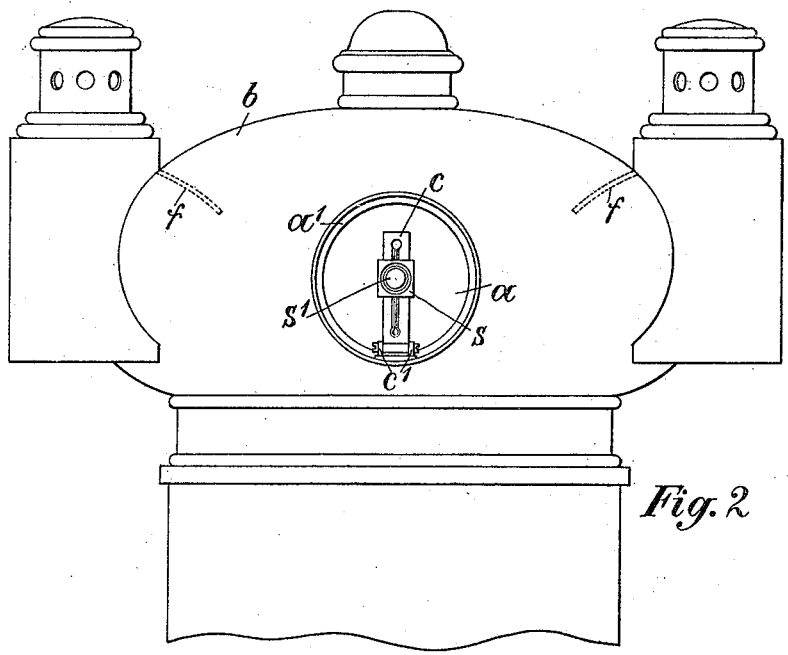

A compass hood into which the bearing taking device in accordance with the present invention has been fitted is illustrated in the accompanying drawing, in which:

Figure 1 is a front elevation. Fig. 2 a rear elevation, and Fig. 3 a longitudinal section on the line A—B in Fig. 1.

An upright slot sight $c$ is arranged on the outer side of the small rear window $a$ of the rotatable compass hood $b$. Exactly opposite this there is an upright sight thread $e$ in front of the inner side of the large front window $d$ in the hood $b$; on the outer side of the window $d$ an adjustable mirror $g$ is arranged for the purpose of rendering the compass rose $u$, and needle $v$, visible to the observer.

The mirror $g$ is arranged in a metal fitting $g^1$ upon which the two small blocks $g^2$ $g^2$ are fixed; these blocks being provided with grooves for the reception of the upright rods $h$, $h$. These rods are connected one with the other by transverse rods $i$ $i$ and their upper ends are engaged in pins $k$ $k$ fixed in the fitting $d^1$ of the window $d$. Springs $h^1$ $h^1$ are fitted to the lower ends of the rods $h$ $h;$ and are suspended from the pins $l$ $l$ in the fitting $d^1$ of the window $d$. A flat spring $m$ which is held upon the fitting $g^1$ of the mirror $g$ by a screw $m^1$ or the like, by means of its two ends, presses on the rods $h$, $h$ and thus draws the blocks $g^2$ onto the latter.

The slot sight $c$ which is pivoted in bearings $c^1$ fixed to the fitting $a^1$ of the small window $a$, receives a slide $s$ comprising a colored glass disk $s^1$ adapted for taking bearings by the sun.

At night time the lamp light is thrown on the compass rose by reflectors $f$, arranged above the light openings $o$ in the compass hood $b$ so that a very sharp image of the rose is visible in the mirror $g$.

The bearing-taking device in accordance with the present invention which is fitted into the compass hood is thus always protected by a hood and cannot be affected by atmospheric influences. By means of this novel device it is possible to take exact terrestrial or astronomical bearings both by day and at night without the slightest difficulty. In rough weather the movements of the ship are not perceptible in the mirror image so that they exert no influence upon the bearing taken.

In use, the compass hood is so placed that the large window $d$, faces the object on which the bearing is to be taken, such as a star, lighthouse, etc. The operator then looks through the small rear window $a$, and the large front window $d$, and turns the hood until thread $e$, and sight slot $c$, become alined with said object. The line thus ascertained intersects with the image of the compass rose reflected by mirror $g$. As the thread arranged back of the large window $d$, is also visible in the mirror, the operator is able to immediately ascertain the course of the ship without leaving his place and without any complicated manipulations.

What I claim is:

1. In a device of the character described, a compass, a superposed rotatable hood having a back window and a front window at diametrically opposite sides of the compass, an inclined mirror on the front window, and a front sight crossing said mirror and front window.

2. In a device of the character described, a compass, a superposed rotatable hood having a back window and a front window at diametrically opposite sides of the compass, an inclined mirror adjustably secured to the front window, and a front sight crossing said mirror and front window.

3. In a device of the character described, a compass, a superposed rotatable hood having a pair of windows at diametrically opposite sides of the compass, a rear sight opposite one of said windows, an inclined mirror on the second window, and a front sight crossing said mirror and second window.

Signed by me at Port Said, Egypt, this 27th day of July 1908.

A. FEY.

Witnesses:
  I. INHULSEN,
  F. HAYI.